United States Patent [19]

Maruyama

[11] Patent Number: 5,961,030
[45] Date of Patent: Oct. 5, 1999

[54] USING PHOSPHORUS COMPOUNDS TO PROTECT CARBON AND SILICON CARBIDE FROM REACTING WITH TITANIUM ALLOYS

[75] Inventor: Benji Maruyama, Yellow Springs, Ohio

[73] Assignee: The United States of America as represented by the Secretary of the Air Force, Washington, D.C.

[21] Appl. No.: 08/964,567

[22] Filed: Nov. 5, 1997

[51] Int. Cl.$^6$ ............... B23K 31/02; B23K 20/00; B21D 39/00
[52] U.S. Cl. ............... 228/190; 228/193; 428/614
[58] Field of Search ................... 228/190, 193, 228/194, 262.2; 428/608, 614

[56] References Cited

U.S. PATENT DOCUMENTS

| | | | |
|---|---|---|---|
| 4,358,544 | 11/1982 | Skedgell | 501/77 |
| 4,499,156 | 2/1985 | Smith et al. | 428/614 |
| 4,733,816 | 3/1988 | Eylon et al. | 228/190 |
| 4,746,374 | 5/1988 | Froes et al. | 148/11.5 F |
| 4,837,053 | 6/1989 | Kao et al. | 427/214 |
| 5,057,135 | 10/1991 | Maruyama et al. | 65/400 |
| 5,238,741 | 8/1993 | Knights et al. | 428/366 |
| 5,354,615 | 10/1994 | Tenhover et al. | 428/366 |
| 5,536,686 | 7/1996 | Chung | 501/111 |
| 5,819,572 | 10/1998 | Krajewski | 72/42 |

*Primary Examiner*—Patrick Ryan
*Assistant Examiner*—Carlos J. Gamino
*Attorney, Agent, or Firm*—Charles E. Bricker; Thomas L. Kundert

[57] ABSTRACT

A method for controlling the interface in a titanium matrix composite between the titanium matrix material and a silicon carbide reinforcing filament or fiber which comprises treating such filament or fiber with a phosphorus-containing compound, and thereafter incorporating the treated fiber into a titanium matrix composite. The quantity of phosphorus remaining on the fiber, following treatment, can be miniscule, so long as at least a trace amount of phosphorus remains on the fiber.

3 Claims, No Drawings

USING PHOSPHORUS COMPOUNDS TO PROTECT CARBON AND SILICON CARBIDE FROM REACTING WITH TITANIUM ALLOYS

RIGHTS OF THE GOVERNMENT

The invention described herein may be manufactured and used by or for the Government of the United States for all governmental purposes without the payment of any royalty.

BACKGROUND OF THE INVENTION

This invention relates to a method for controlling and reducing the reaction zone in a titanium matrix composite.

Titanium matrix composites (TMC) are a class of high specific strength/stiffness, intermediate temperature composite structures developed for next generation aircraft turbine engines. The excellent properties of TMCs arise from the combination of high strength titanium alloy matrices with high strength/stiffness fibers. TMC reinforcements are typically monofilament silicon carbide fibers, such as SCS-6 from Textron Specialty Materials. These fibers have strengths in excess of 4 GPa, with Young's moduli over 400 GPa. Although these fibers have exceptional mechanical properties, they are extremely sensitive to flaws and cracks. Therefore, it is imperative that the fibers be protected as much as possible.

Protection of these monofilament fibers is afforded by a several-micron thick pyrolytic carbon-rich coating, which shields the fibers from damage in three ways: (1) as a sizing, it protects the fiber from handling damage; (2) as a weakly bonded mechanical interface, it deflects matrix cracks away from the fiber; and (3) as a sacrificial layer, it protects the silicon carbide portion of the fiber from reaction, and thus degradation, with the matrix.

Titanium matrix composites are typically fabricated by superplastic forming/diffusion bonding of a sandwich consisting of alternating layers of metal and fibers. Under superplastic forming (SPF) conditions, which involve the simultaneous application of pressure and elevated temperature for a period of time, the titanium matrix material can be made to flow without fracture occurring, thus providing intimate contact between layers of the matrix material and the fiber. The thus-contacting layer of matrix material bond together by a phenomenon known as diffusion bonding (DB).

Titanium matrix composites can also be fabricated by superplastic forming/diffusion bonding of a plurality of reinforcing fibers coated with the matrix material by vapor deposition or by sputtering. The matrix-coated fibers are consolidated by SPF/DB, as above.

Titanium matrix composites have not reached their full potential, at least in part, because of problems associated with instabilities at the fiber-matrix interface. At the time of high temperature bonding, a reaction can occur at the fiber-matrix interfaces, giving rise to what is generally called a reaction zone. The thickness of the reaction zone increases with increasing time and with increasing temperature of bonding. The reaction zone surrounding a filament introduces sites for easy crack initiation and propagation within the composite, which can operate in addition to existing sites introduced by the original distribution of defects in the filaments. It is well established that mechanical properties of metal matrix composites (MMC) are influenced by the reaction zone, and that, in general, these properties are degraded in proportion to the thickness of the reaction zone.

Control of the fiber/matrix reaction is a difficult, yet important problem to resolve, because of a basic conflict between the need to protect the fiber from excessive reaction versus optimization of composite consolidation parameters and matrix microstructural evolution. In order to ensure integrity of the carbon coating, TMCs utilizing SCS-6 are typically consolidated below about 1000° C. However, optimization of the matrix microstructure requires solutionizing in the beta-phase field, which, for Ti-6Al-4V, is about 1066° C.

One approach to protecting the fiber while enlarging the processing window consists of coating the fibers with diffusion barriers which slow the kinetics of the fiber/matrix reaction. While affording some protection to the fiber, these coatings add cost and mechanical complexity to the composite.

Another approach is to pre-process the matrix metal. Smith et al, U.S. Pat. No. 4,499,156, issued Feb. 12, 1985, disclose titanium alloy composites having a reduced reaction zone between the alloy matrix and the filament which is fabricated using a fine grain alloy sheet. Eylon et al, U.S. Pat. No. 4,733,816, issued Mar. 29, 1988, and Froes et al, U.S. Pat. No. 4,746,374, issued May 24, 1988, each disclose the use of rapidly solidified titanium alloy foil to produce composites having a reduced reaction zone.

Thus, a variety of choices are available to metal matrix composite fabricators. Together with these choices are several possible problems. On the one hand, if consolidation temperature is too low or consolidation pressure is too low, the resulting composite lacks desired strength due to incomplete bonding. On the other hand, if consolidation temperature is too high, the resulting composite may lack desired strength because of the resulting brittle reaction zone. If the thickness of the reaction zone is controlled, as disclosed by one of the aforementioned methods, the composite may lack certain desired physical properties.

Accordingly, what is desired is a method for controlling the interface between a titanium alloy matrix and a carbon-coated silicon carbide reinforcing filament or fiber.

It is an object of the present invention to provide a method for controlling the interface in a titanium matrix composite between the titanium alloy matrix and the carbon-coated silicon carbide reinforcing filament or fiber.

Other objects and advantages of the present invention will be apparent to those skilled in the art.

SUMMARY OF THE INVENTION

In accordance with the present invention there is provided a method for controlling the interface in a titanium matrix composite between the titanium matrix material and a silicon carbide reinforcing filament or fiber. The method of the present invention comprises treating such filament or fiber with a phosphorus- or boron-containing compound, and thereafter incorporating the treated fiber into a titanium matrix composite. The quantity of phosphorus or boron remaining on the fiber, following treatment, can be miniscule, so long as at least a trace amount of phosphorus or boron remains on the fiber.

DETAILED DESCRIPTION OF THE INVENTION

The method of the present invention comprises the steps of treating a silicon carbide reinforcing fiber or filament with a phosphorus- or boron-containing compound, preparing a preform consisting of alternating layers of titanium alloy and the treated reinforcing fiber, and consolidating the preform by the simultaneous application of pressure and increased temperature.

The phosphorus-containing compounds suitable for use in the present invention include phosphorus pentoxide, phosphoric acid, phosphorus-containing hydrocarbons, such as phosphoric acid-monoethyl ether, phosphorus salts, such as $KPF_6$, mixed oxides, such as the phosphosilicates, and phosphides, such as TiP, AlP, BP, and the like.

The boron-containing compounds suitable for use in the present invention include boron oxide, boron acids, such as boric acid, boracic acid and the like, boron salts, and the like, with the proviso that borides, such as titanium boride, boron nitride, boron carbide and any other boron-containing compounds capable of withstanding very high temperatures without decomposition, e.g., greater than about 500° C., are not included.

The fibers can be treated, most simply, by coating from a liquid mixture or solution of the phosphorus- or boron-containing compound in a suitable liquid carrier, such as, for example, a binder solution consisting of an acrylic dissolved in methyl ethyl ketone. The coated fibers are dried in air, then heated in a furnace at an elevated temperature, e.g., about 400° C., for about 20 minutes to char or stabilize the coating. Alternatively, the fibers can be treated by depositing a phosphorus- or boron-containing compound onto the fibers using chemical vapor deposition (CVD) or physical vapor deposition (PVD).

The method of this invention may be employed to fabricate metal matrix composites using any titanium alloy, including alpha+beta, near-alpha and beta titanium alloys, as well as the ordered titanium-aluminum intermetallic compounds, $Ti_3Al$ and TiAl, including alpha-2, orthorhombic and gamma titanium aluminides.

Typical alpha+beta, beta and near-alpha titanium alloys include the following (all amounts in weight percent): Ti-6Al4V, Ti-6Al-6V-2Sn, Ti-8Mn, Ti-7Al4Mo, Ti-4.5Al-5Mo-1.5Cr, Ti-6Al-2Sn-4Zr-6Mo, Ti-5Al-2Sn-2Zr-4Mo-4Cr, Ti-6Al-2Sn-4Zr-2Mo-2Cr, Ti-6Al-2Sn-2Zr-2Mo-2Cr, Ti-3Al-2.5V, Ti-5Al-2.5Sn, Ti-8Al-1Mo-1V, Ti-6Al-2Sn-4Zr-2Mo-0.1Si, Ti-6Al-2Nb-1Ta-0.8Mo, Ti-2.25Al-11Sn-5Zr-1Mo, Ti-5.5Al-3.5Sn-3Zr-0.3Mo-1Nb-0.3Si, Ti-5.5Al-4Sn-4Zr-0.3Mo-1Nb-0.5Si-0.06C, Ti-30Mo, Ti-13V-11Cr-3Al, Ti-3Al-3V-6Cr-4Mo-4Zr, Ti-15V, Ti-11.5Mo-6Zr4.5Sn, Ti-10Mo, Ti-6.3Cr, Ti-15V-3Cr-3Al-3Sn and Ti-10V-2Fe-3Al. These alloys may further contain up to about 6 weight percent of a dispersoid such as boron, thorium or rare earth elements.

Typical ordered titanium-aluminum intermetallic alloys include the following (all amounts in weight percent):Ti-16Al, Ti-15.8Al, Ti-14Al-22Nb, Ti-14.3Al-19.7Nb, Ti-15Al-10.3Nb, Ti-15.4Al-5.3Nb, Ti-14Al-25Nb, Ti-14Al-20Nb-3V-2Mo, Ti-14.6Al-10Nb-4W, Ti-13Al-31Nb, Ti-11Al-39Nb, Ti-13Al-40Nb, Ti-36Al, Ti-31Al-2.5Cr-2.5Nb and Ti-31.5Al.

As stated previously, the composites are fabricated by superplastic forming/diffusion bonding of a sandwich consisting of alternating layers of metal and fibers. Under superplastic conditions, the titanium alloy matrix material can be made to flow without fracture occurring, thus providing intimate contact between layers of the matrix material and the fiber. The thus-contacting layers of matrix material bond together by a phenomenon known as diffusion bonding.

The metal layers for fabricating the above-described sandwich are rolled foil having a thickness of 3 to 10 mils, or preferably, rapidly solidified foil having a thickness of about 10 to 100 microns. The layers may also be produced by powder techniques, such as plasma spray, tape casting or powder cloth.

Consolidation of the filament/metal layer preform sandwich is accomplished under suitable consolidating conditions, generally by application of heat and pressure over a period of time during which the matrix material is superplastically formed around the filaments to completely embed the filaments. Consolidation is carried out at a temperature in the approximate range of 50° to 300° C. (90° to 540° F.) below the beta-transus temperature of the titanium alloy. For example, the consolidation of a composite comprising Ti-6Al-4V alloy, which has a beta transus of about 995° C. (1825° F.) is preferably carried out at about 900° to 925° C. (1650° to 1700° F.). The pressure required for consolidation of the composite ranges from about 66 to about 200 MPa (about 10 to 30 Ksi) and the time for consolidation can range from about 15 minutes to 24 hours or more, depending upon the dimensions of the composite. Generally, consolidation time is about 2 to 4 hours.

The phrase "suitable consolidating conditions" is intended to mean heating the alloy-fiber preform to a temperature below the beta-transus temperature $T_b$) of the alloy while applying a pressure of at least 10 Ksi for a time sufficient to effect consolidation. In the case of conventional alloys, the term "beta-transus" refers to the temperature at the line on the phase diagram for the alloy separating the $\beta$-phase field from the $\alpha+\beta$ region where the $\alpha$ and $\beta$ phases coexist.

In the case of alpha-2 alloys, the term "beta-transus" refers to the temperature at the line on the phase diagram for the alloy separating the $\beta$-phase field from the $\alpha_2+\beta$ region where the $\alpha_2$ and $\beta$ phases coexist. In the case of orthorhombic alloys, the term "beta-transus" refers to the temperature at the line on the phase diagram for the alloy separating the $\beta$-phase field from the region where the $\beta$ and o phases, and possibly the $\alpha_2$ phase, coexist.

For ease of handling, it is desirable to introduce the filaments or fibers into the article in the form of a sheet or mat. Such a sheet may be fabricated by laying out a plurality of filaments in parallel relation upon a suitable surface and wetting the filaments with a fugitive thermoplastic binder, such as polystyrene. After the binder has solidified, the filamentary material can be handled as one would handle any sheet-like material. It is within the scope of the invention to incorporate the phosphorus- or boron-containing compound into the binder material, so that the fibers are treated at the same time they are fabricated into the sheet or mat form.

The preform is consolidated by superplastic forming/diffusion bonding, as previously discussed. If a fugitive binder is used with the reinforcing material, such binder must be removed prior to consolidation of the segments, without pyrolysis occurring. By using an apparatus equipped with heatable dies and a vacuum chamber surrounding at least the dies, removal of the binder and consolidation may be accomplished without having to relocate the preform from one piece of equipment to another.

The following example illustrates the invention:

EXAMPLE

About 1 gram of phosphorus pentoxide powder was dissolved in 5 ml Robond®, a binder solution consisting of acrylic dissolved in methyl ethyl ketone, available from Monsanto, St. Louis, Mo. SCS-6 fibers were coated this mixture and dried in air at room temperature. The coated fibers were heated in a furnace at 400° C. for 20 minutes to char, or stabilize the coating. The fibers were assembled into a preform with Ti-6Al-4V, then hot pressed at 950° C., 100 MPa for 1 hour. Untreated fibers were similarly assembled into a preform with Ti-6AL-4V, then hot pressed at 950° C., 100 MPa for 1 hour.

A portion of each of the thus-consolidated structures was heat treated for 43 hours at 950° C. Metallographic cross-sections were made of the treated and untreated, heat-treated and non-heat-treated samples. The phosphorus- and heat-treated samples exhibited about 40 percent less reaction zone between the fiber and the matrix alloy than did the samples which were not treated with phosphorus. Energy dispersive spectroscopy (EDS), which has a delectability of about 1% and a spatial resolution of about 1 $\mu$m, evidenced no detectable phosphorus in the phosphorus-treated samples, thus indicating that the phosphorus-treatment is effective at low residual concentrations.

The primary advantage of the method of the present invention is the reduction in the reaction zone, thus providing a measure of protection against degradation of mechanical properties in titanium matrix composites. A second advantage, particularly when compared to diffusion barriers, is cost. Further, it is expected that treatment according to the invention will inhibit gasification of the carbon coating on the fiber when an exposed end in a titanium matrix composite is in contact with oxygen at an elevated temperature.

Various modifications may be made in the instant invention without departing from the spirit and scope of the appended claims.

I claim:

1. In a process for the fabrication of a metal matrix composite of a titanium alloy matrix and a silicon carbide reinforcing fiber comprising the steps of (a) preparing a preform consisting of alternating layers of titanium alloy and reinforcing fiber, and (b) consolidating the preform by the simultaneous application of pressure and increased temperature, the improvement which consists of treating said fiber with a phosphorus-containing compound prior to incorporating said fiber into said preform.

2. The process of claim 1 wherein said phosphorus-containing compound is phosphorous pentoxide.

3. In a process for the fabrication of a metal matrix composite of a titanium alloy matrix and a plurality of silicon carbide reinforcing fibers comprising the steps of (a) coating a plurality of said fibers with said alloy matrix material and (b) consolidating the matrix-coated fibers by the simultaneous application of pressure and increased temperature, the improvement which consists of treating said fiber with a phosphorus-containing compound prior to coating with said matrix material.

* * * * *